(12) United States Patent
Hirono et al.

(10) Patent No.: US 9,569,651 B2
(45) Date of Patent: Feb. 14, 2017

(54) CONTROLLER FOR OPTICAL INFORMATION READER

(71) Applicant: OPTOELECTRONICS CO., LTD., Warabi-shi, Saitama (JP)

(72) Inventors: Mitsuaki Hirono, Warabi (JP); Naoya Niizeki, Warabi (JP); Masaki Kurokawa, Warabi (JP); Jun Higa, Warabi (JP)

(73) Assignee: OPTOELECTRONICS CO., LTD., Warabi-shi (JP)

( * ) Notice: Subject to any disclaimer, the term of this patent is extended or adjusted under 35 U.S.C. 154(b) by 0 days.

(21) Appl. No.: 15/052,033

(22) Filed: Feb. 24, 2016

(65) Prior Publication Data

US 2016/0253535 A1 Sep. 1, 2016

Related U.S. Application Data

(60) Provisional application No. 62/121,929, filed on Feb. 27, 2015.

(30) Foreign Application Priority Data

Oct. 6, 2015 (JP) .................................. 2015-198690

(51) Int. Cl.
  *G06K 7/10* (2006.01)
(52) U.S. Cl.
  CPC ....... *G06K 7/10851* (2013.01); *G06K 7/10554* (2013.01); *G06K 7/10831* (2013.01); *G06K 2007/10495* (2013.01)

(58) Field of Classification Search
  CPC .................... G06K 7/10732; G06K 7/10722
  USPC ....................................................... 235/462.42
  See application file for complete search history.

(56) References Cited

U.S. PATENT DOCUMENTS 8,789,759 B2* 7/2014 Xian ..................... G06K 7/1408
                                          235/462.06

FOREIGN PATENT DOCUMENTS

WO       2013/116467 A2    8/2013

* cited by examiner

*Primary Examiner* — Jamara Franklin
(74) *Attorney, Agent, or Firm* — Westerman, Hattori, Daniels & Adrian, LLP

(57) ABSTRACT

In an optical information reader controlled by this controller, a laser beam originating in light emitted by a laser diode is reflected by a scan mirror to scan optical information of a bar code or the like, reflected light therefrom is received by a photodiode to be converted to an electrical signal, and the optical information is read by processing the signal. In the controller, a main amp having a characteristic that a gain changes according to a frequency of an input signal amplifies the electrical signal, a detector detects an analog signal resulting from the amplification, and from a detection output thereof, a MPU (on/off frequency control circuit) detects level of the analog signal and adjusts the gain of the main amp by changing an on/off frequency of the laser diode caused by an APC circuit (light emission on/off circuit), according to the detected level.

7 Claims, 6 Drawing Sheets

Standard
Duty 50%

Far Distance
Duty 70%

Near Distance
Duty 30%

CONTROLLER FOR OPTICAL INFORMATION READER

FIELD OF THE INVENTION

This invention relates to a controller for an optical information reader for reading optical information of a bar code and the like.

BACKGROUND OF THE INVENTION

As an optical information reader, bar code readers which read optical information of bar codes, two-dimensional codes, and the like indicating information such as names and prices of products are used widely by a distribution industry and a retail industry.

The bar code readers are roughly classified into hand-held ones held by one hand when in use and stationary ones, and the hand-held ones further include a pen type, a touch type, and a light beam scanning type (laser type).

A bar code reader of the light beam scanning type shapes light emitted by a light source such as a laser diode (LD) into a beam, deflects the light beam by a mirror so that the light beam hits on a bar code, and while rotating or vibrating (swinging) the mirror, scans the bar code so that the light beam moves across the bar code.

Then, reflected light from the bar code is condensed, and the condensed light is received by a light-receiving sensor such as a photodiode (PD), and is converted to an electrical signal. The electrical signal is coded after amplified and the resultant is output as bar code read information.

Such an optical information reader of the light beam scanning type is constituted as illustrated in FIG. 7 in a conventional example disclosed in, for example, PLT1.

The optical information reader illustrated in FIG. 7 includes a scanning/detecting part 50 having a laser diode LD and a photodiode PD, a scan mirror 60, and a signal processing part 70.

An oscillator 51 and a pulsed laser driver 52 in the scanning/detecting part 50 cause the laser diode LD to emit light with a predetermined frequency, and this laser light is passed through a collimator lens and an aperture, which are not illustrated, to be radiated as a laser beam. This laser beam is reflected by the scan mirror 60 which is vibrated back and forth by a drive circuit and a drive mechanism, which are not illustrated, and is made to scan a bar code 80 printed on a product or the like.

Reflected light from the bar code 80 is reflected again by the scan mirror 60, is condensed by a not-illustrated collector mirror or condenser lens, and is received by the photodiode PD of the scanning/detecting part 50. A current according to an amount of the received reflected light (light intensity) from striped light parts and dark parts of the bar code 80 flows in the photodiode PD, and its current output is converted to a voltage signal by a preamplifier 53.

This voltage signal is passed through a high pass filter (HPF) 54, and only a band component with a predetermined frequency or more is amplified by an AGC circuit 55, with a gain being automatically adjusted, and is detected by a synchronous detector 56 in synchronization with an oscillation cycle of the oscillator 51.

Its detection output signal is sent to the signal processing part 70 and is passed through a high pass filter (HPF) or a differential circuit 71, and only a high-frequency component is amplified again by an AGC circuit 72, with a gain being automatically adjusted, and becomes an analog output. The analog output of the AGC circuit 72 is passed through a low pass filter (LPF) 73, and the resultant becomes its control signal.

Further, the analog output is compared by a comparator 74 with a signal which is the same analog output having been smoothed by passing through a low pass filter (LPF) 75, and the result is binarized and is output as a binarized signal. Further, the same analog output is binarized by an edge digitizer 76 to be output as a binarized signal. These output signals are sent to a microcomputer (CPU), where the bar code is decoded (read).

CITATION LIST

Patent Literature (PTL1) WO 2013/116467A2

SUMMARY OF INVENTION

Technical Problem

A controller for such a conventional optical information reader is complicated in circuit structure and has a large number of components, and is also high in cost due to a need for a high-performance amp.

Object of the Invention

The invention was made in consideration of the above technical background, and has an object to simplify the structure of a controller for an optical information reader to reduce the number of components and to make it possible to accurately read optical information without using a high-performance amp.

Solution to Problem

A controller for an optical information reader according to the invention is a controller for an optical information reader in which a laser beam originating in light emitted by a laser diode is reflected by a scan mirror to scan optical information, reflected light from the optical information is received by a photodiode to be converted to an electrical signal, and the optical information is read by processing the electrical signal, and in order to achieve the above object, the controller is constituted as follows.

The controller includes: an on/off light emission circuit which causes the laser diode to turn on and off to emit light, on and off; an amp which amplifies the electrical signal; and an on/off frequency control circuit which detects level of an amplitude of an analog signal resulting from the amplification by the amp, and according to the level, changes an on/off frequency of the laser diode caused by the on/off light emission circuit, wherein the amp is an amp having a characteristic, that a gain changes according to a frequency of an input, signal.

Preferably, the amp has a characteristic that the gain reduces as the frequency of the input signal increases, and the on/off frequency control circuit performs control so as to decrease the on/off frequency of the laser diode when the level of the amplitude of the analog signal is lower than a lower prescribed value, so as to increase the on/off frequency of the laser diode when the level of the amplitude of the analog signal is higher than a higher prescribed value and the analog signal is not saturated, and so as to increase the on/off frequency of the laser diode and reduce light emission power of the laser diode when the analog signal is saturated.

More preferably, the amp has a gain characteristic having gain peaking, and the on/off frequency control circuit changes the on/off frequency of the laser diode within a characteristic range in which the gain reduces as the frequency of the input signal increases. The on/off frequency control circuit is capable of changing a frequency of a pulsed signal that causes the laser diode to turn on and off, by changing a frequency of a pulse width modulation signal that controls the on/off light emission circuit, according to the level of the amplitude of the analog signal resulting from the amplification by the amp.

Desirably, these control circuits for the optical information readers each include a detector which detects the analog signal resulting from the amplification by the amp, and the on/off frequency control circuit detects the level of the amplitude of the analog signal resulting from the amplification by the amp, from a detection output of the detector. The detector is preferably an envelope detecting circuit or a synchronous detector.

The on/off frequency of the laser diode is made twice as high as a frequency of a detection signal of the optical information or more, which enables the removal of an influence of noise due to LED lighting.

Advantageous Effects of Invention

The controller for the optical information reader according to the invention has a simple circuit structure and needs only a small number of components, and makes it possible to accurately read optical information of a bar code or the like without using a high-performance amp.

DETAILED DESCRIPTION

Hereinafter, modes for carrying out the invention will be described based on the drawings.

Figure 1:
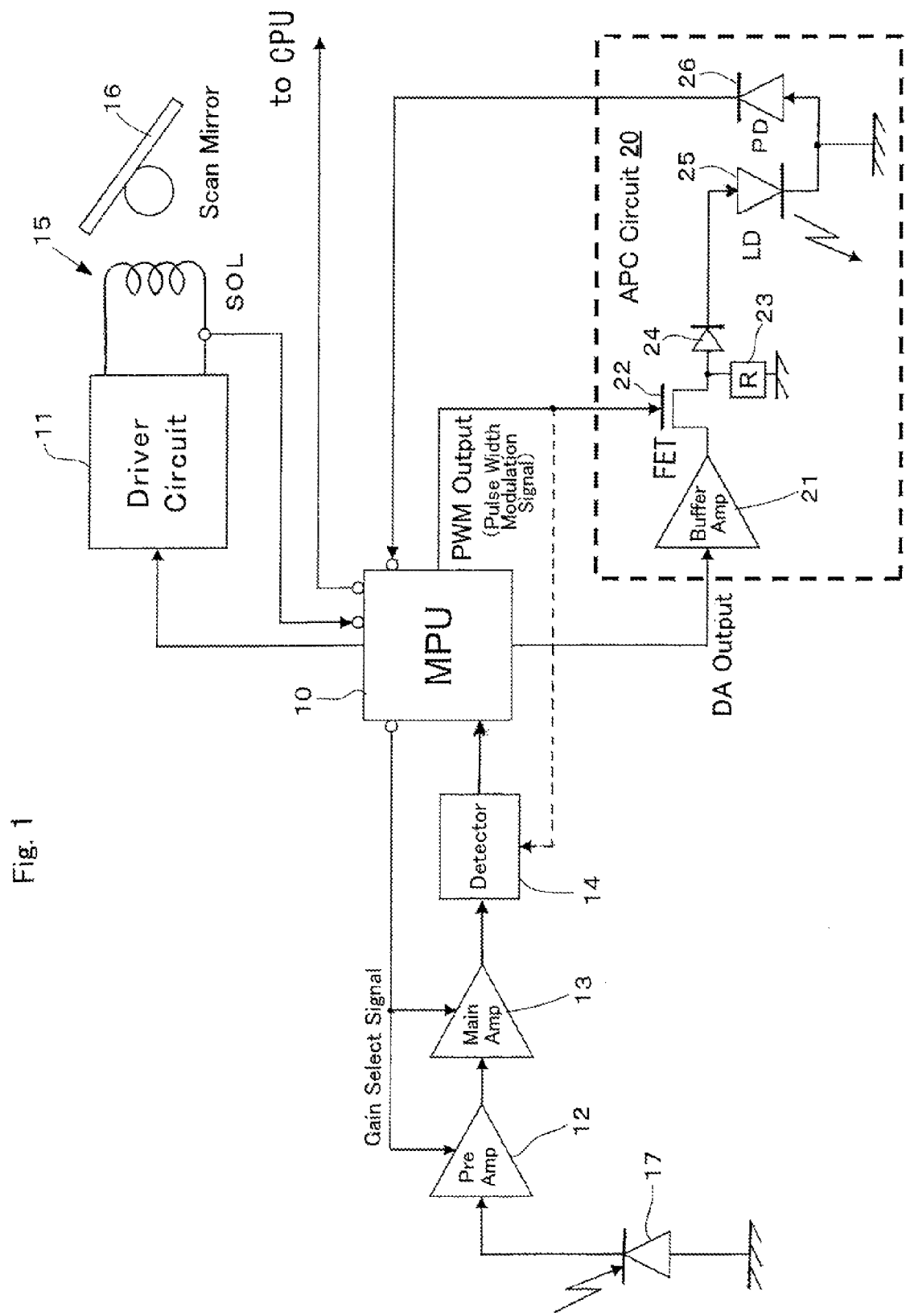
FIG. 1 is a circuit diagram illustrating one embodiment of a controller for an optical information reader according to the invention.

FIG. 1 is a circuit diagram illustrating one embodiment of a controller for an optical information reader according to the invention. This controller is composed of a microprocessor unit (MPU) 10, an automatic power controller (APC) circuit 20, a drive circuit 11, a pre amp 12, a main amp 13, and a detector 14.

The automatic power controller (APC) circuit 20 includes a buffer amp 21, a FET (field-effect transistor) 22 for switching, a resistor 23, a diode 24, a laser diode (LD) 25, and a photodiode (PD) 26 for monitoring light emission of the laser diode 2).

The MPU 10 includes a central processing unit, a program memory, a data memory, an A/D converter circuit, and a D/A converter circuit, and has a program processing function of controlling the entire controller.

In the automatic power controller (APC) circuit 20, an analog signal (DA output) which decides a peak value of a pulse causing the laser diode 25 to emit light is input, from the MPU 10 to the buffer amp 21. Then, a pulsed signal which is obtained after an output signal of the buffer amp 21 is passed through the FET 22 which is on/off-controlled by a PWM (Pulse Width Modulation) output, that is, a pulse width modulation signal, output from the MPU 10, and through the diode 24 is applied to the laser diode 25 to cause the laser diode 25 to turn on and off. Therefore, the APC circuit 20 functions as the on/off light emission circuit that causes the laser diode 25 to turn on and off to emit light on and off.

The photodiode 26 monitors luminescence intensity of the laser diode 25 and feeds back its detection signal to the MPU 10. According to the detection signal the MPU 10 changes the DA output so that the luminescence intensity, that is, power of the laser diode 25 is kept constant, to thereby control the peak value (amplitude) of the pulsed signal causing the laser diode 25 to turn on and off. This is an automatic power control function by the APC circuit 20 and the MPU 10.

Further, from a later-described detection output of the detector 14, the MPU 10 detects level (indicating magnitude) of an amplitude of an analog signal resulting from the amplification by the main amp 13, and according to the detected level, changes a frequency of the pulse width modulation signal being the PWM output to change a frequency of the pulsed signal with which the APC circuit 20 causes the laser diode 25 to emit light on and off.

Therefore, in this embodiment, the MPU 10 functions as the on/off frequency control circuit, and detects the level of the amplitude of the analog signal resulting from the amplification by the amp, and according to the detected level, changes the on/off frequency of the laser diode 25 caused by the APC circuit 20 being the on/off light emission circuit.

Incidentally, in this embodiment, from the detection output that the detector 14 outputs as a result of detecting the analog signal resulting from the amplification by the main amp 13 the MPU 10 detects the level of the amplitude of the analog signal. Accordingly, the detection output becomes a low-frequency analog signal with a half-wave waveform including only a bar code detection signal. With a high-frequency Carrier component in the analog signal due to the on/off light emission of the laser diode 25 being removed therefrom, which enables the MPU 10 to easily detect the level of its amplitude.

However, if the MPU 10 playing a role of the on/off frequency control circuit includes, for example, a multi-level A/D converter circuit capable of high-speed response, the MPU 10 may directly receive the analog signal resulting from the amplification by the main amp 13 to detect the level of its amplitude, without the detector 14 being provided. Further, the pre amp 12 and the main amp 13 are serially provided as the amp in this embodiment, but one amp may serve as the both.

Further, the MPU 10 drives a solenoid 15 by controlling the drive circuit 11 to vibrate back and forth the scan mirror 16. Consequently, a laser beam obtained after laser light emitted by the laser diode 25 is passed through a collimator lens and an aperture, which are not illustrated, is reflected by the scan mirror 16 and is made to scan a bar code printed on a product or the like.

The reflected light from the bar code is reflected by the scan mirror 16 again, is condensed by a not-illustrated collector mirror or condenser lens, and is received by a photodiode 17. A current according to an amount of the received reflected light (light intensity) from striped light parts and dark parts of the bar code flows in the photodiode 17, and its current output is converted to a voltage signal by the pre amp 12.

The voltage signal is amplified by the main amp 13. The analog signal resulting from the amplification by the main amp 13 is detected by the detector 14, and an analog signal being its detection output is input to the MPU 10. The MPU 10 outputs the analog signal and/or a binarized signal which is this analog signal being binarized, and sends this to the microcomputer (CPU) on a subsequent stage to make the microcomputer decode (read) the bar code. Alternatively, the MPU 10 may execute the decoding of the bar code.

The pre amp 12 is an amp which converts a current output to a voltage signal, such as a trans impedance amp. The main amp 13 is an amp having a characteristic that its gain changes according to a frequency of an input signal, and its details will be described later. The gains of these pre amp 12 and main amp 13 are switched to a plurality of levels according to a gain select from the MPU 10 at the time of, for example, coarse adjustment. One amp may serve as both the pre amp 12 and the main amp 13 as previously described.

As the detector 14, usable is a tuning-envelope detecting circuit composed of a tuning circuit and a diode and a low pass filter, an envelope detecting circuit in which the turning circuit is omitted (hereinafter, they will be both referred as "an envelope detecting circuit, and its function will be referred to as "envelope detection"), a synchronous detector, or the like. In the case where the detector 14 is the synchronous detector, the detection is performed in synchronization with the PWM output (pulse width modulation signal) from the MPU 10 as indicated by the broken line arrow in FIG. 1.

Figure 2:
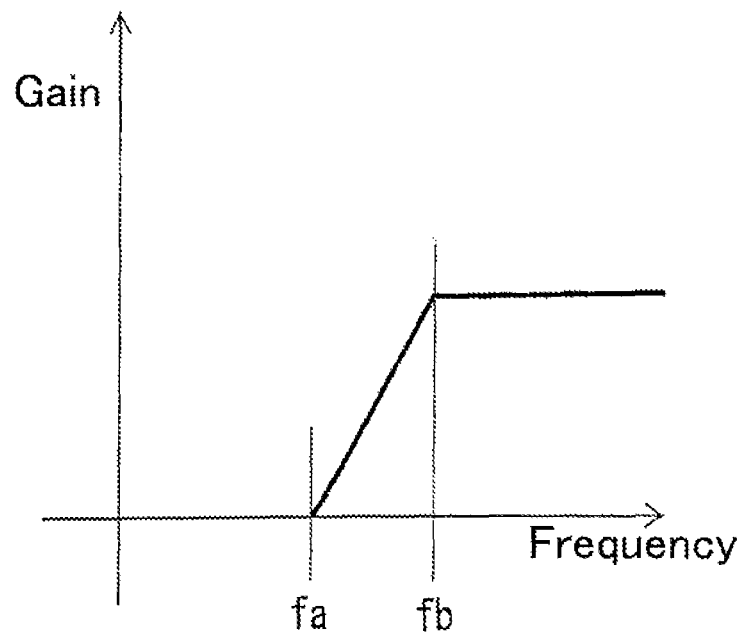
FIG. 2 is a graph illustrating an ideal gain characteristic of a high pass amp.

FIG. 2 is a graph illustrating an ideal gain characteristic of a high pass amp. In this gain characteristic, the gain linearly increases in accordance with an increase of the frequency when the frequency of the input signal is from fa to fb (fa<fb), and becomes constant in a frequency band equal to fb or higher.

Figure 3:
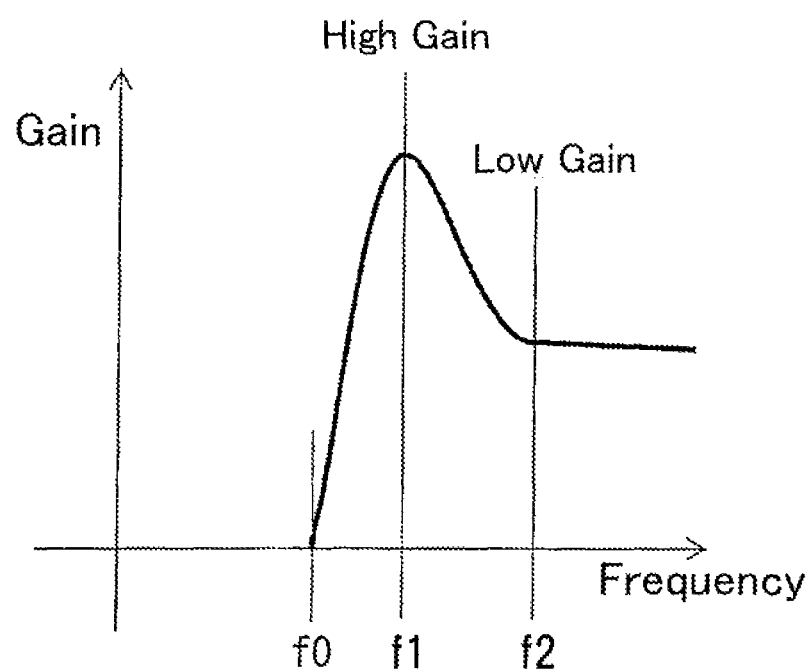
FIG. 3 is a graph illustrating a desirable gain characteristic of a high pass amp used in the controller of the invention.

FIG. 3 is a graph illustrating a desirable gain characteristic of the high pass amp used in the controller of the invention. In this gain characteristic, when the frequency of the input signal is from f0 to f1 (f0<f1), the gain rapidly increases in accordance with an increase of the frequency to reach the peak at f1, and the gain reduces between f1 and f2 (f1<f2) in accordance with an increase of the frequency, and the gain becomes constant in a frequency band equal to f2 or higher Therefore, this amp has a gain characteristic, that the gain peaking is at the frequency f1.

In this embodiment, as the main amp 13 illustrated in FIG. 1, a high pass amp having the gain characteristic illustrated in FIG. 3 is used A frequency (carrier frequency) of the voltage signal input to the main amp 13 corresponds to the on/off frequency of the laser diode 25, that is, the frequency of the PWM output (pulse width modulation signal) with which the MPU 10 on/off-controls the FET 22.

Here, the MPU 10 detects the level of the amplitude of the analog signal resulting from the amplification by the main amp 13, by performing multi-level AD conversion of the analog signal being the detection output input from the detector 14. Then, the MPU 10 changes the frequency of the PWM output (pulse width modulation signal) according to the level of the amplitude of the analog signal, and controls the pulsed signal causing the laser diode 25 to turn on and off, as follows. In this case, it is assumed that the main amp 13 has the gain characteristic having the gain peaking as illustrated in FIG. 3, and the on/off frequency of the laser diode 25 is changed within the range between the frequencies f1 to f2 being a characteristic range in which the gain reduces in accordance with the increase of the frequency of the input signal.

(1) A case where the bar code is at a far distance (the level of the analog signal resulting from the amplification by the main amp 13 is lower than a lower prescribed value)

The carrier frequency is lowered is made to approach f1 in FIG. 3) by decreasing the on/off frequency of the laser diode 25 by decreasing the frequency of the PWM output, whereby the gain of the main amp 13 is increased.

(2) A case where the bar code is at a near distance (the level of the analog signal resulting from the amplification by the main amp 13 is higher than a higher prescribed value) and this analog signal is not saturated The carrier frequency is increased (made to approach f2 in FIG. 3) by increasing the on/off frequency of the laser diode 25 by increasing the frequency of the PWM output, whereby the gain of the main amp 13 is lowered.

(3) A case where the bar code is at a near distance and the analog signal resulting from the amplification by the main amp 13 is saturated Similarly to the case of the above (2), the carrier frequency is increased to lower the gain of the main amp 13, and in the case where the detector 14 is the envelope detecting circuit, the duty of the pulsed signal causing the laser diode 25 to turn on and off is reduced to reduce an ON width. Consequently, light emission power being a heat quantity (laser power×light emission time) per second caused by the light emission of the laser diode 25 is reduced. Consequently, an envelope detection output lowers.

In the case where the detector 14 is the synchronous detector, the DA output which is input from the MPU 10 to the buffer amp 21 in FIG. 1 is lowered to lower the peak value of the pulsed signal causing the laser diode 25 to turn on and off, whereby the light emission power is reduced.

On the other hand, in a case where the amp has a gain characteristic that the gain increases in accordance with the increase of the frequency of the input signal, for example, in a case where the amp has the gain characteristic illustrated in FIG. 2 and the on/off frequency of the laser diode 25 is changed within the range of the frequencies fa to fb, or in a case where the amp has the gain characteristic illustrated in FIG. 3 and the on/off frequency of the laser diode 25 is changed within the range of the frequencies f0 to f1, the control is performed in an opposite manner to that of the above-described case.

That is, in the case of the above (1), the carrier frequency is increased by increasing the on/off frequency of the laser diode 25 by increasing the frequency of the PWM output, whereby the gain of the main amp 13 is increased.

In the case of the above (2), the carrier frequency is decreased by decreasing the on/off frequency of the laser diode 25 by decreasing the frequency of the PWM output, whereby the gain of the main amp 13 is lowered.

In the case of the above (3), the control is performed so as to lower the gain of the main amp 13 by decreasing the carrier frequency similarly to the case of the above (2), and so as to reduce the light emission power of the laser diode 25 in the same manner as the above.

Incidentally, since changing the carrier frequency being the on/off frequency of the laser diode 25 changes an output value, of the laser diode 25 due to response performance of the FET 22 which turns on/off the laser diode 25 and of the laser diode 25, a signal of the laser output monitored by the photodiode 26 is fed back to the MPU 10, and the MPU 10 adjusts a value of the DA output so that it becomes a constant output value.

Figure 4A:
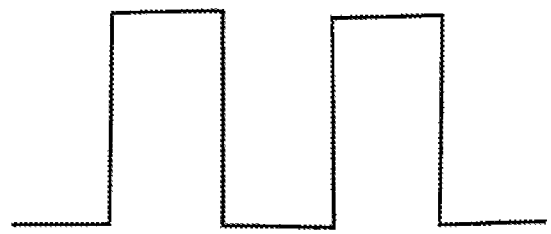
FIG. 4A, FIG. 4B, and FIG. 4C are waveform charts illustrating examples of duty of a pulsed signal which causes a laser diode to turn on and off in a case where a bar code is at a standard distance, a far distance, and a near distance respectively.
Figure 4B:
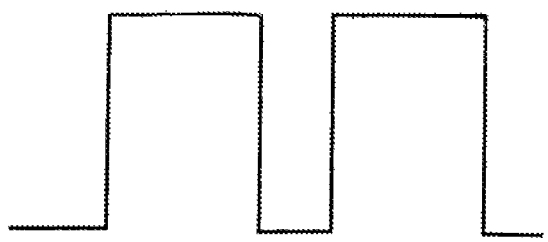
Figure 4C:
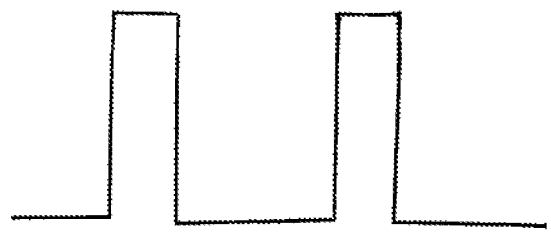

FIG. 4A, FIG. 4B, and FIG. 4C are waveform charts illustrating examples of the duty of the pulsed signal causing the laser diode 25 to emit light on and off when the bar code is at a standard distance, a far distance, and a near distance respectively. FIG. 4A, FIG. 4B, and FIG. 4C illustrate three kinds of pulsed signals whose duties are 50%, 70%, and 30% respectively. Peak values of these pulsed signals are all equal.

Since the light emission power corresponding to the heat quantity by the light emission of the laser diode 25 is light emission luminance x light emission period, and thus corresponds to an area of the waveform of each of the pulsed signals. If the peak value is constant, the light emission luminance is constant, and thus the light, emission power changes depending on the duty. That is, as the duty is larger (an ON pulse width is wider), the light emission power increases.

Further, when the peak value of this pulsed signal is changed, the light emission luminance of the laser diode 25 changes, and thus the light emission power changes even if the duty is the same. The peak value changes depending on the DA output which is output by the MPU 10 to be input to the buffer amp 21 in FIG. 1.

Figure 5:
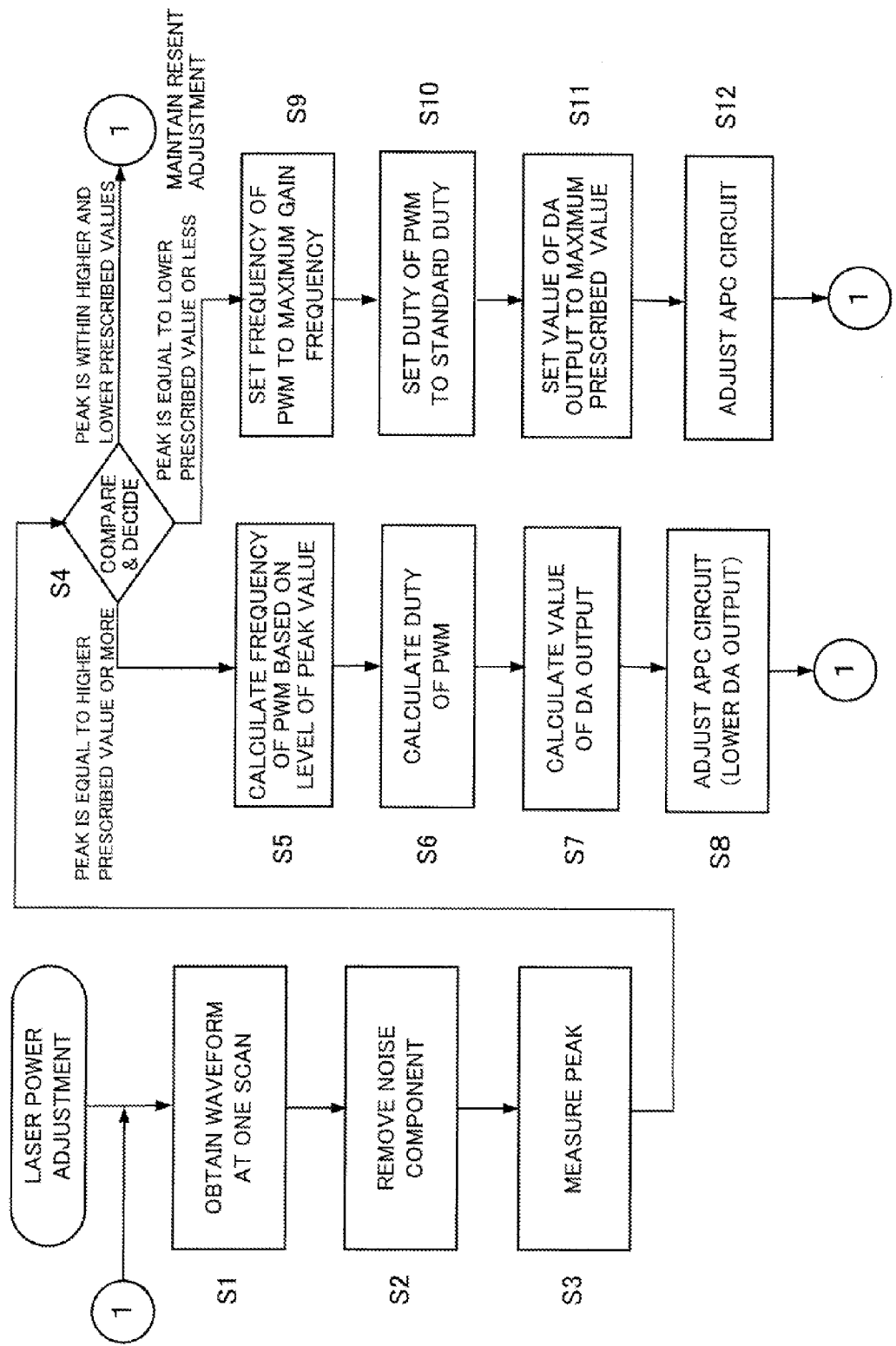
FIG. 5 is a flowchart illustrating a processing example of light emission power adjustment by a MPU in FIG. 1.

Next, a processing example of the adjustment of the light emission power of the laser diode 25 by the MPU 10 in FIG. 1 will be described based on the flowchart in FIG. 5.

When the MPU 10 starts this processing, it obtains, at Step S1, the waveform of the detection output when the bar code is scanned once. Then, at Step S2, the MPU 10 removes a noise component, and at Step S3, measures the peak. This peak value corresponds to the level (magnitude) of the analog signal resulting from the amplification by the main amp.

Thereafter, at Step S4, the MPU 10 compares and decides the measured peak value with the higher prescribed value and the lower prescribed value , and if it is equal to the higher prescribed value or more, the MPU 10 goes to Step S5 to calculate the frequency of the PWM output (pulse width modulation signal) based on the level of the peak value. Next, at Step S6, the MPU 10 calculates the duty of the PWM output, and at Step S7, calculates the value of the DA output. Based on these results, at Step S8, the MPU 10 changes the frequency, the duty, and the peak value of the PWM output to adjust the APC circuit 20, and thereafter returns to Step S1 to repeat the above-described operations. In a case where the detector 14 is the synchronous detector, the MPU 10 lowers the DA output to lower the light emission luminance of the laser diode 25, thereby lowering the light emission power.

When determining at Step S4 that the peak value is equal to the lower prescribed value or less, the MPU 10 goes to Step S9 to set the frequency of the PWM output to the maximum gain frequency (f1 in FIG. 3). Next, at Step S10, the MPU 10 sets the duty of the PWM output to the standard duty illustrated in FIG. 4A, and at Step S11, sets the value of the DA output to the maximum prescribed value. Based on these results, at Step S12, the MPU 10 changes the frequency, the duty, and the peak value of the PWM output to adjust the APC circuit 20, and thereafter returns to Step S1 to repeat the above-described operations.

When determining at Step S4 that the peak value is within the higher and lower prescribed values, the MPU 10 maintains the present adjustment and returns to Step S1 to repeat the above-described operations.

Next, a noise removing effect when this optical information reader is used in an environment under LED (light-emitting diode) lighting will be described with reference to FIG. 6. In the environment under the LED lighting, the following problem occurs.

The LED lighting turns on/off at 50 to 200 kHz, and a frequency of a bar code detection signal by the photodiode is 0 to 200 kHz in a case where a scan speed is an ordinary speed of about 100 scans/sec. This frequency changes depending on a thickness of each black and white bars of the bar code and the scan speed.

Figure 6:
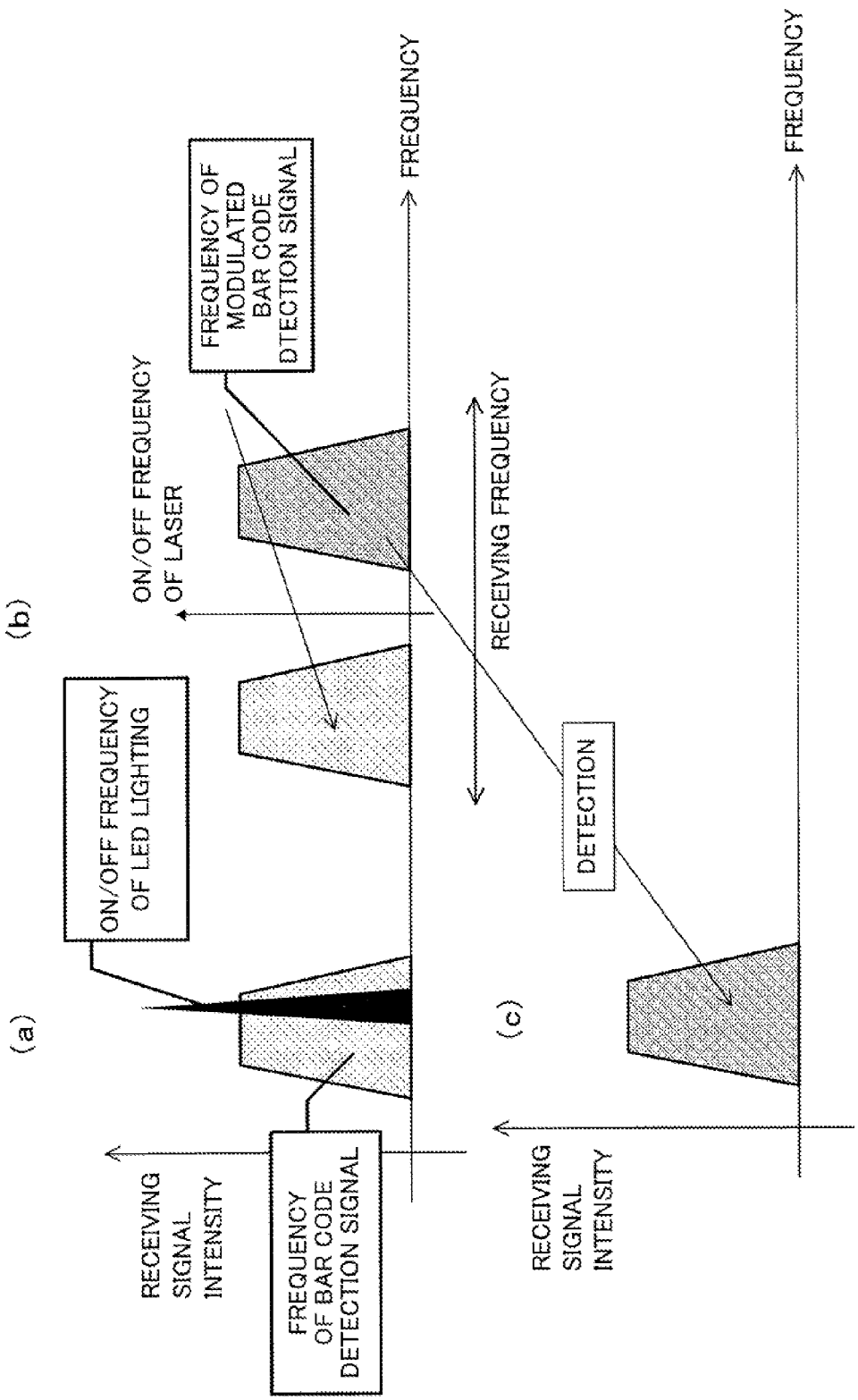
FIG. 6 is an explanatory chart of a noise removal effect by the embodiment of the invention when it is used in a LED lighting environment.
Figure 7:
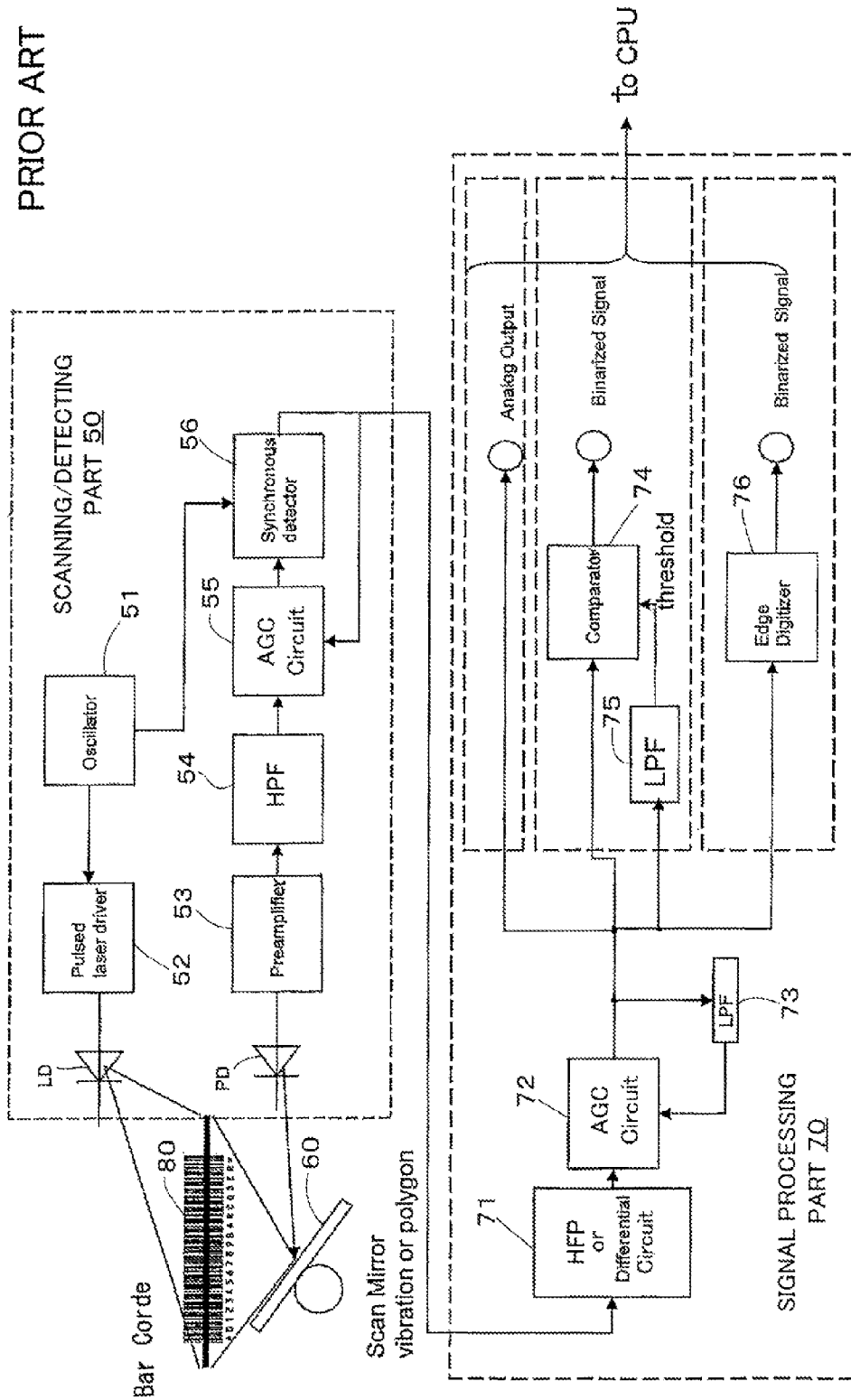
FIG. 7 is a circuit block diagram illustrating a structure example including a conventional controller for an optical information reader.

Because of the above, the on/off frequency of the LED lighting and the frequency of the bar code detection signal are likely to overlap with each other, and the waveform received by the photodiode under the LED lighting becomes a waveform in which the waveform of the LED lighting and the waveform of the bar code are added as illustrated in (a) in FIG. 6, which does not allow correct recognition.

On the other hand, in the optical information reader in which the controller according to the invention is mounted, it is possible to cause the laser diode 25 to emit light on and off, with a frequency twice as high as the frequency of the bar code detection signal or more (for example, 500 kHz), and to modulate the waveform of the frequency of the bar code.

Consequently, it is possible to make a receiving frequency of the reflected light, from the bar code to be double side band whose center is a modulation frequency (the on/off frequency of the laser diode 25 for example, 500 kHz) as illustrated in (b) in FIG. 6. Consequently, it is possible to remove the waveform of the on/off frequency of the LED being a low frequency which is a half of the modulation frequency or less.

Then, by detecting a signal in one of the side bands, for example, in the upper side band, it is possible to reproduce the bar code detection signal having the original frequency, with the component with the on/off frequency of the LED being removed, as illustrated in (c) in FIG. 6.

The optical information read by the optical information reader in which the controller according to the invention is mounted is not limited to bar codes but may be two-dimensional codes such as PDF417 of a stacked type.

Hitherto, the embodiments of the invention have been described, but the invention is not limited to these, and it goes without saying that, in carrying out the invention, addition and changes can be appropriately made to their structures or part of the structures may be omitted, or shapes and materials may be changed. The structures of the above-described embodiments and modification examples can of course be carried out by being arbitrarily combined as long as they are not mutually inconsistent.

INDUSTRIAL APPLICABILITY

The controller for the optical information reader according to the invention is applicable to various kinds of optical information readers such as a bar code reader.

What is claimed is:
1. A controller for an optical information reader in which a laser beam originating in light emitted by a laser diode is reflected by a scan mirror to scan optical information, reflected light from the optical information is received by a photodiode to be converted to an electrical signal, and the optical information is read by processing the electrical signal, the controller comprising:

an on/off light emission circuit which causes the laser diode to turn on and off to emit light on and off;

an amp which amplifies the electrical signal; and an on/off frequency control circuit which detects level of an amplitude of an analog signal resulting from the amplification by the amp, and according to the level, changes an on/off frequency of the laser diode caused by the on/off light emission circuit, wherein the amp is an amp having a characteristic that a gain changes according to a frequency of an input signal.

2. The controller for the optical information reader according to claim 1, wherein the amp has a characteristic that the gain reduces as the frequency of the input signal increases, and wherein the on/off frequency control circuit performs control so as to decrease the on/off frequency of the laser diode when the level of the amplitude of the analog signal is lower than a lower prescribed value, so as to increase the on/off frequency of the laser diode when the level of the amplitude of the analog signal is higher than a higher prescribed value and the analog signal is not saturated, and so as to increase the on/off frequency of the laser diode and reduce light emission over of the laser diode when the analog signal is saturated.

3. The controller for the optical information reader according to claim 2, wherein the amp has a gain characteristic, having gain peaking, and the on/off frequency control circuit changes the on/off frequency of the laser diode within a characteristic range in which the gain reduces as the frequency of the input signal increases.

4. The controller for the optical information reader according to claim 1, wherein the on/off frequency control circuit changes a frequency of a pulsed signal that causes the laser diode to turn on and off, by changing a frequency of a pulse width modulation signal that controls the on/off light emission circuit, according to the level of the amplitude of the analog signal resulting from the amplification by the amp.

5. The controller for the optical information reader according to claim 1, further comprising a detector which detects the analog signal resulting from the amplification by the amp, wherein the on/off frequency control circuit detects the level of the amplitude of the analog signal resulting from the amplification by the amp, from a detection output of the detector.

6. The controller for the optical information reader according to claim 5, wherein the detector is an envelope detecting circuit or a synchronous detector.

7. The controller for the optical information reader according to claim 1, wherein the on/off frequency of the laser diode is twice as high as a frequency of a detection signal of the optical information or more.

* * * * *

UNITED STATES PATENT AND TRADEMARK OFFICE
CERTIFICATE OF CORRECTION

PATENT NO. : 9,569,651 B2  
APPLICATION NO. : 15/052033  
DATED : February 14, 2017  
INVENTOR(S) : Mitsuaki Hirono et al.

Page 1 of 1

It is certified that error appears in the above-identified patent and that said Letters Patent is hereby corrected as shown below:

In the Claims

Column 9 Line 30, Claim 2:  
Change:  
"over"

To Be:  
--power--

Signed and Sealed this  
Thirtieth Day of May, 2017

Michelle K. Lee  
*Director of the United States Patent and Trademark Office*